United States Patent [19]

Balk

[11] Patent Number: 5,559,957
[45] Date of Patent: Sep. 24, 1996

[54] FILE SYSTEM FOR A DATA STORAGE DEVICE HAVING A POWER FAIL RECOVERY MECHANISM FOR WRITE/REPLACE OPERATIONS

[75] Inventor: Michael W. Balk, Piscataway, N.J.

[73] Assignee: Lucent Technologies Inc., Murray Hill, N.J.

[21] Appl. No.: 455,926

[22] Filed: May 31, 1995

[51] Int. Cl.$^6$ .................................................. G06F 11/34
[52] U.S. Cl. .................... 395/182.21; 395/650; 395/750; 364/280.2; 364/DIG. 1
[58] Field of Search ....................................... 395/180, 181, 395/182.21, 182.12, 650, 750; 364/260.8, 280.2, 280.3, 273.4

[56] References Cited

U.S. PATENT DOCUMENTS

| | | | |
|---|---|---|---|
| 4,989,134 | 1/1991 | Shaw | 364/200 |
| 5,218,698 | 6/1993 | Mandl | 395/650 |
| 5,317,752 | 5/1994 | Jewett et al. | 395/750 |
| 5,355,483 | 10/1994 | Serlet | 395/650 |
| 5,485,613 | 1/1996 | Engelstad et al. | 395/650 |

FOREIGN PATENT DOCUMENTS 61-194540  8/1986  Japan ............................ G06F 11/22

OTHER PUBLICATIONS

H. M. Deitel "Operating Systems", 1990 pp. 198–201, 394–395.

*Primary Examiner*—Robert W. Beausoliel, Jr.
*Assistant Examiner*—Albert Decady
*Attorney, Agent, or Firm*—Nicholas J. Skarlatos

[57] ABSTRACT

The present invention provides a method and apparatus in a data storage device of a data storage system under the control of a microprocessor for preventing a microprocessor stall upon the occurrence of a power failure during read/write operations. During normal operations, files are written to a first storage area of the data storage device where a first flag associated with each file is set when the writing of the respective file has successfully completed. Upon the occurrence of a power failure, a data storage device initialization routine is commenced upon reboot of the microprocessor. During initialization, an analysis phase is begun to generate sequences of events for at least those files not having the first flag set. The events comprise memory operations and associated data and are each re-executable upon interruption of its execution and before execution of another event without modifying results of a previous execution of the respective event. The events generated are then written to an event storage area in the data storage device. During an execution phase of the data storage device initialization, the events are retrieved and executed by the microprocessor to cause the files having at least the first flag set to be written in a compacted manner to storage locations in a second storage area of the memory device to maintain the integrity of those files. Subsequently, the first storage area of the memory device is erased to provide additional storage space for the writing of new files to the memory device. If a power failure or system failure occurs during the two-phase initialization process, the process is re-started generally at the point where it was interrupted so as not to leave the data storage device in a partially compacted, and hence, a potentially inconsistent state.

18 Claims, 3 Drawing Sheets

FILE SYSTEM FOR A DATA STORAGE DEVICE HAVING A POWER FAIL RECOVERY MECHANISM FOR WRITE/REPLACE OPERATIONS

BACKGROUND OF THE INVENTION

1. Field of the Invention

This invention relates to file systems for data storage devices including among others semiconductor memories, disc drives and tape drives, and more particularly, to such file systems which implement garbage collection processes and power fail recovery mechanisms.

2. Description of the Prior Art

In most computer systems and other intelligent computing devices, a microprocessor or central processing unit is coupled to a redundant memory storage system comprising a main memory and a secondary memory. Main memory is used for the temporary storage of information that can be quickly retrieved by the microprocessor for use in program execution. Secondary memory is typically used as an adjunct to the main memory for the long-term storage of information needed for other, non-active program applications. Accordingly, main memory storage devices typically comprise fast devices such as semiconductor memories, while secondary memory storage devices comprise slower, electro-mechanical disk storage devices.

With respect to semiconductor memory devices, such memories may include read only memory (ROM) devices which are non-volatile memories that cannot be written to or erased, random access memory (RAM) devices which are volatile, read-write memory storage devices that are electrically erasable at the byte level, and read-mostly memory devices which are non-volatile memories that can be written to, read from and are electrically erasable at either the chip level, sector level or byte level. The class of read-mostly memory devices includes optically erasable programmable read-only memory (EPROM) devices, electrically erasable programmable read-only memory (EEPROM) devices and FLASH memory devices. Although EPROM devices must be erased in their entirety at the chip level in order to reprogram or write new information to them, both EEPROM and FLASH memory devices provide greater flexibility by enabling the microprocessor to read and write information at the byte and sector levels, respectively.

Recently, prior art read-mostly memory devices have been designed to allow for the storage of data files and application programs on the purely solid-state medium. Accordingly, through the use of system resident filing systems, a read-mostly memory device can be utilized as a secondary memory for a computer system or the like to thereby reduce the relatively slow prior art upload of information from secondary to primary memory.

In prior art memory systems, usable address space is recovered through what is commonly known as a garbage collection process. Although there are a number of classical garbage collection schemes in existence, one particular scheme known as the "mark and sweep" scheme recovers the usable address space by removing older files not currently in use in a multi-phase process. During normal memory writes, storage is allocated from a free list of storage spaces until some minimum threshold of available memory storage is reached. Upon reaching the threshold, the program application is stopped and garbage collection commences. All files in memory are then traversed, and those files that are determined to be currently in use are marked in a first phase of the process. When the entire set of files has been traversed, a sweep phase is begun in which memory storage is recovered by removing all the unmarked files.

The benefit of the mark and sweep scheme is that no dead files survive the garbage collection process, and the entire memory storage allocated can be used for storage. However, a negative aspect of this scheme is that memory fragmentation can become a serious problem unless compaction or an elaborate multi-space allocation is performed. Yet, if file compaction is used, the memory system is left in a dangerous, inconsistent state throughout the garbage collection process. This is because the occurrence of a power failure or other type of system failure during the garbage collection process will cause the microprocessor managing the memory system to stall upon reboot and file system initialization since the data files are at that time dispersed throughout memory.

SUMMARY OF THE INVENTION

The present invention provides a method and apparatus in a data storage device of a data storage system under control of a microprocessor for preventing a microprocessor stall upon the occurrence of a power failure during read/write operations. This is accomplished by implementing a data storage device initialization routine which ensures the integrity of the files stored in the file system of the data storage device upon reboot of the microprocessor. During normal operations, files are written to a first storage area of the memory device where a first flag associated with each file is set when the writing of the respective file has successfully completed.

Upon the occurrence of a power failure, all unwanted files stored in the memory device including partially written files are removed upon reboot of the microprocessor by commencing the initialization routine. In a first, analysis phase of the routine, a sequence of events forming a sequence of atomic or basic memory operations and associated data is generated and written in order to an event storage area of the data storage device for each file having the first flag set. Each event is re-executable in that it can be re-executed upon interruption of its execution and before execution of another event without modifying results of a previous execution of the respective event. The events generated are then written to an event storage area of the data storage device from which they are retrieved and executed by the microprocessor during a second, execution phase of the routine. During the execution phase, the wanted files (i.e. those having the first flag set) are compacted into a second storage area of the data storage device while all the files stored in the first storage area are removed to provide additional storage space for the writing of new files to the data storage device.

If a power failure or system failure occurs during the initialization, the process is re-started generally at the point where it was interrupted so as not to leave the file system in a partially compacted, and hence, inconsistent state. Due to the separation and tracking of the analysis and execution phases and the in-order execution of the sequences of re-executable events, the present invention maintains the integrity of the file system after a failure so as to prevent the occurrence of a microprocessor stall.

DETAILED DESCRIPTION

Figure 1:
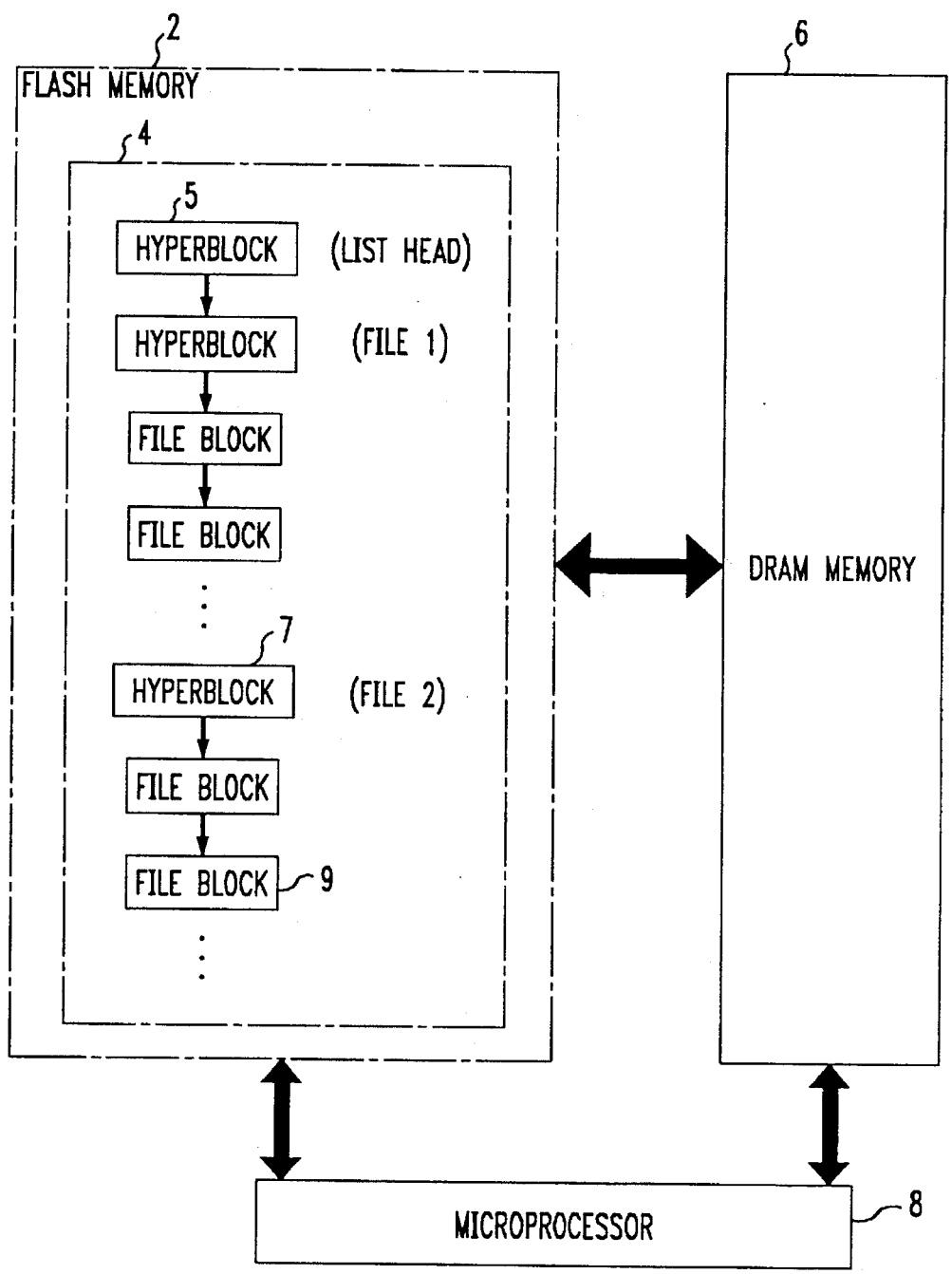
FIG. 1 depicts the memory system in which the file system of the presented invention is implemented, including a FLASH memory and a DRAM memory under control of a microprocessor.

As shown in FIG. 1, the present invention provides a file system 4 for a data storage device 2 of a data storage system 1 having an re-entrant garbage collection process for preventing a microprocessor stall upon the occurrence of a power failure or other system failure.

FILE SYSTEM ARCHITECTURE

The file system 4 is designed as a flat file system 4 managed by a hierarchy of program objects which create and execute specific, atomic memory operations. The object hierarchy is divided into three levels of program architecture: a high level application interface, a virtual device level and a device driver level. The high level application interface presents a view of the files system as a set of files that can be read, written and removed. It further provides a means to query information about the files system, such as the amount of free space remaining. The virtual device level maps blocks of bytes into files and free space, while maintaining a linked list of files referenced by sets of contiguous and monitonically increasing block and sector numbers which form the logical addresses of the files. The device driver level acts as the interface between the virtual device level and the memory devices themselves and performs the translation between the logical addresses generated by the virtual device and the physical addresses of the memory devices. With this functional architecture, the file system 4 of the present invention can span more than one memory device or chip (as long as all the devices are of the same memory type) by tracking the number of devices and their physical addresses.

In the embodiment shown in FIG. 1, the file system 4 of the present invention is implemented in the secondary memory 2 of a memory system 1 comprising at least a primary, volatile memory 6 and a secondary, non-volatile read-mostly memory 2 under the control of a microprocessor 8, central processing unit or the like. In one embodiment, the primary memory 6 comprises DRAM memory devices and the secondary memory 2 comprises AM29200 FLASH PROM devices, while the microprocessor 8 comprises a AM29200 RISC microprocessor. The file system 4 may also be implemented in a memory system 1 comprising EEPROM memory devices as the secondary read-mostly memory.

Figure 2:
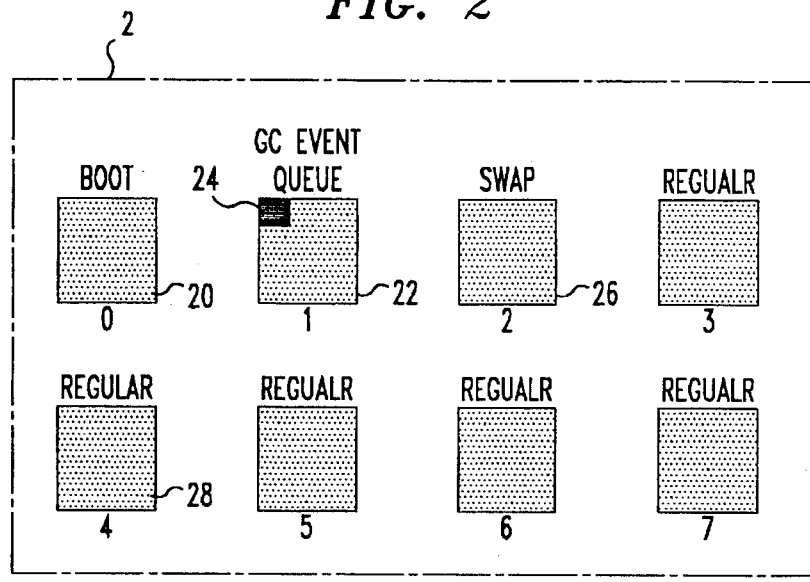
FIG. 2 is a sector map of a FLASH memory device or chip showing a single boot sector, an event sector, a swap sector and a plurality of regular data sectors.

As shown in FIG. 2, each AM29200 FLASH PROM is physically divided into eight sectors. If needed, one or more of the first sequential sectors of at least the first device are allocated as the boot sector(s) 20 for the microprocessor 8. The next two sequential sectors are designated as an event queue sector 22 and a swap sector 26, respectively. Any remaining sectors of the first and/or subsequent devices then form regular sectors 28 for the storage of file system data.

The boot sectors 20 are used by the microprocessor operating system to store boot code and data necessary to start the operating system, the file system 4 and any applications that must be started at boot time. The event queue sector 22 is the first sector following the boot sector 20 and is used in the garbage collection process to track and execute the sequences of atomic memory operations causing the removal of older, unused files and partial files. The swap sector 26 is the next sector after the event queue sector 22 and is used during garbage collection to reconstruct the regular sectors 28. During reconstruction, those files not marked or tagged for garbage collection are sequentially written in a contiguous manner to the swap sector 26. The swap sector 26 is then copied as an entire sector to one of the regular sectors 28 as the destination sector. This is performed for each populated, regular sector 28 in the memory device so as to produce a compacted file system of contiguous files.

In the above described embodiment of the file system 4, the files are written to and read from the regular sectors 28 in data block chunks of 64 bytes such that each regular sector holds an integral number of data blocks (i.e. 1024 blocks for the device type given above). However, this need not be the case, where, for example, a memory device (i.e. EEPROM) is utilized which permits read and write operations to be performed at the bit and/or byte levels. In this example, the data chunk sizes would be selected in accordance with application functions and device requirements.

With respect to the file system 4 structure shown in FIG. 1, files are written to the file system 4 in a sequential manner, with each file comprising a hyperblock 7 and one or more file blocks 9 of 64 bytes each. A hyperblock 7 is a data structure which denotes the beginning of a file and is used to store information about the file and its location in the file system virtual device. A file block 9 is a data structure which represents a block of data belonging to the file. The information stored in each file hyperblock 7 includes:

a hyperblock identifier, the number of free blocks in the file system, the address of the current hyperblock, the creation time for the current hyperblock, the number of bytes in the current file, the number of blocks in the current file, the character name of the current file, a hyperblock complete (hok) flag indicating whether the hyperblock was successfully written, a file block complete (fok) flag indicating whether all file blocks of the current file were successfully written, and a garbage flag indicating whether the current file is to be removed in the next garbage collection process.

Additionally, upon the very first write to the file system 4, a file system list head hyperblock 5 is created as the first block in the file system 4. Although this list head hyperblock 5 is a true hyperblock, it does not denote a file nor contain file data since its purpose is to maintain pertinent information about the creation of the file system 4. Accordingly, it is identified in the file system 4 as that hyperblock 7 having the hok flag set, the fok flag unset and a null string in the file name field, and at any given time, it can be used to determine the number of free bytes and free blocks in the file system 4 in addition to the creation time for the entire file system 4.

The set of all hyperblocks 7 in the file system 4 forms a virtual linked list of all current files. The list is virtual in that a preceding hyperblock 7 does not contain a pointer to the next hyperblock, but rather, contains sufficient information about the current file to enable calculation of the linear address of the hyperblock 7 of the next file. In one embodiment, this information comprises the linear address of the hyperblock 7 of the current file being examined (i.e. the sector and block number of that sector) in addition to the total number of its appended file blocks 9. Nonetheless, the file system 4 of the present invention may just as well be implemented through the use of pointers.

To write an application file to the file system 4, a File object is created upon an application call to the file system virtual device. The File object retrieves an in-memory copy of the last hyperblock 7 created in the file system 4 and determines from the information contained in that hyperblock 7 whether there is sufficient free space in the file system media to write the entire, current application file, in addition to the starting address in the file system 4 where the current file will be written. If sufficient space exists for the current file, the File object appends the file to the end of the linked list of files by creating a hyperblock 7 for the current file and writing to that hyperblock 7 the file system specific information set forth above. Once this is done, the File object sets the hok flag in the hyperblock 7, appends the file data blocks of the current file to the hyperblock 7 and then sets the fok flag in that hyperblock 7.

After the current file has been written to the file system 4, the file object subsequently searches the hyperblocks 7 of each of the previously written (i.e. older) files to determine if the file name of the current file matches the file names of any of the older files. During the search, the File object ignores those files for which the garbage collection flag has been set. If there is a match between file names, the garbage collection flag in the hyperblock 7 of each of the older, matching files is set.

GARBAGE COLLECTION PROCESS

In accordance with one embodiment of the present invention, the garbage collection process is used at any time when it is desired to remove unwanted files comprising duplicative files and partial files from the file system 4. The most common situation in which the process is invoked is when an attempt to write a new file to the file system 4 fails due to an insufficient amount of space remaining in the file system 4 (i.e. the regular data sectors of the memory device). In this case, the file object invokes the garbage collection process to remove any and all files that have been previously tagged as unwanted, garbage files. A second attempt is then made to write the new file to the file system 4, and if this attempt fails, an error code is returned to the program application to indicate either that the file system 4 has no more free space or that a device failure has occurred.

The garbage collection process is also invoked as part of the file system initialization routine executed upon reboot of the microprocessor 8 after the occurrence of a power failure, microprocessor failure, memory system failure or the like. The purpose of this use is to remove any partially written files that may have been left in file system 4 upon an interrupted write operation or garbage collection process in order to prevent a microprocessor stall from occurring due to the retrieval of an incomplete file. Accordingly, when the memory system 1 is powered up in a reboot, the microprocessor 8 loads into its primary DRAM memory 6 boot code comprising the file system initialization routine stored in the boot sectors 20 of the FLASH memory device 2. When executed by the microprocessor 8, an attempt is made to read the file system list head hyperblock 5 from the first regular sector 28 of the secondary memory 2. If it is not found there, another attempt is made to read the list head 5 from the first block of the swap sector 26 where the list head 5 is likely to reside if the power failure occurred during garbage collection. If the list head 5 is read successfully, a copy of it is stored in primary memory 6 for future use by the file system 4. If the list head 5 is not found, then the file system 4 is unusable and must be rebuilt from the boot code in the boot sectors 20 of the FLASH memory device 2.

In contrast to conventional garbage collection processes, the process of the present invention is designed to be re-entrant so as to maintain the integrity of the file system 4 and ensure that the occurrence of a power failure or the like during a garbage collection session does not stall the microprocessor 8. This is accomplished by first dividing the garbage collection process into separate analysis and execution phases and recording the results of the analysis phase independent of both the analysis and execution mechanisms in order that the analysis phase need not be re-entered upon an interrupted execution phase. Secondly, the results of the analysis phase are formulated in terms of individual, atomic events or memory operations which are re-executable in that they can be re-executed upon interruption of their execution and before execution of another (subsequent) event without modifying results a previous execution of the same events. In this manner, an event for which a previous execution was interrupted by a power failure may be re-executed from beginning to end without adversely affecting the current state of the FLASH memory device 2 (i.e. the bit pattern previously written to a particular storage location).

Figure 3:
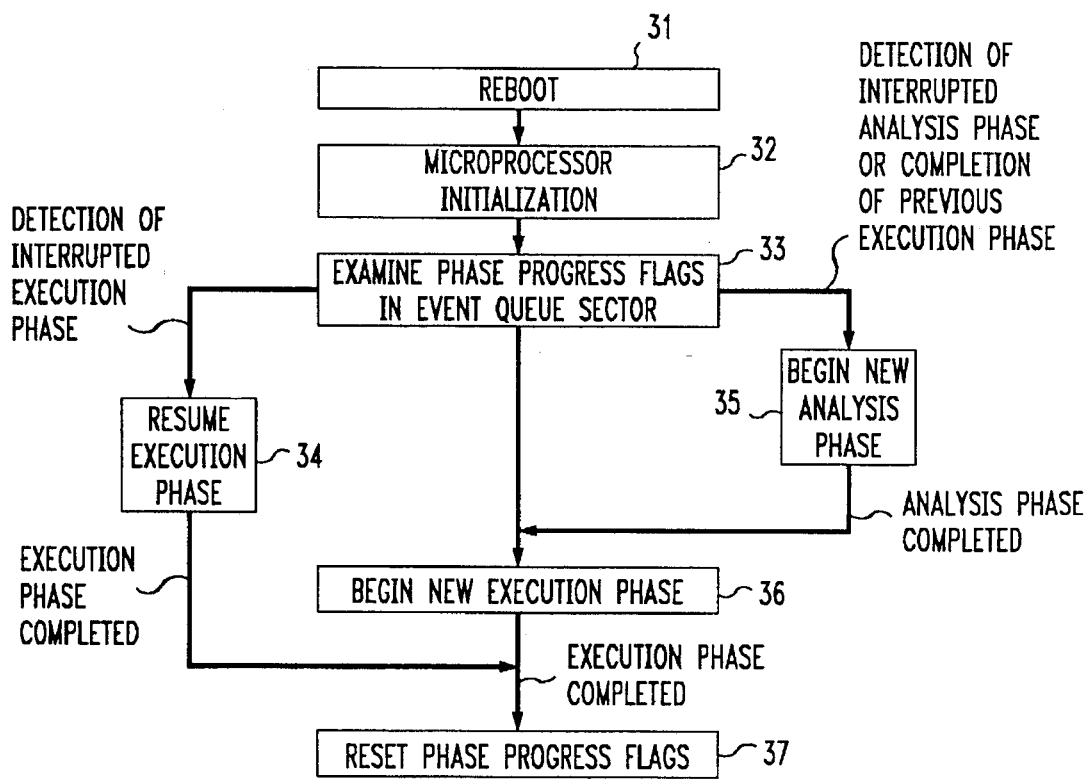
FIG. 3 is a flow chart depicting the over-all dual phase garbage collection process of the present invention.

To accomplish the first task set forth above, phase progress flags are used to denote at any given time which garbage collection phase or phases have been commenced and which phase or phases have been completed. The progress flags are stored separately from the regular file data in the first block of the event queue sector 22 and comprise an analysis phase begun flag, an analysis phase completed flag, an execution phase begun flag and an execution phase completed flag. Referring to the flow chart of FIG. 3, when garbage collection is invoked as part of the file system initialization routine, the first block of the GC event queue sector 22 is read and the flags stored therein are examined by the microprocessor 8 to determine if a previous garbage collection session was interrupted by the power failure, and if so, during what phase.

As shown in Table I below, if all the flags are set or unset, then the previous session was not interrupted at the time of the power failure, and the garbage collection process will be run in its entirety as part of the initialization procedure. The difference between having all flags set or having all flags unset is whether the power failure occurred before or after the flags were cleared after completion of the previous garbage collection session. If, however, the analysis phase was begun but not completed, the results of that analysis are discarded and a new analysis phase is commenced. Note that in this case, the state of the file system 4 is preserved due to the fact that no events for the interrupted analysis were executed. If the analysis phase was completed but the execution phase was not begun, the process will then resume with the execution of events in the event queue 24 written there during the previous analysis phase. Finally, if the execution phase was begun but not completed, then execution of the events in the event queue 24 is resumed starting at that event for which its execution was interrupted. Consequently, once it is determined during file system initialization whether the previous garbage collection process was interrupted or not, the initialization proceeds by either commencing the analysis phase or by commencing or resuming the execution phase.

TABLE I

| analysis begun | analysis completed | execution begun | execution completed | |
|---|---|---|---|---|
| 0 | 0 | 0 | 0 | begin analysis |
| 1 | 0 | 0 | 0 | begin analysis |
| 1 | 1 | 0 | 0 | begin execution |
| 1 | 1 | 1 | 0 | resume execution |
| 1 | 1 | 1 | 1 | begin analysis |

Figure 4:
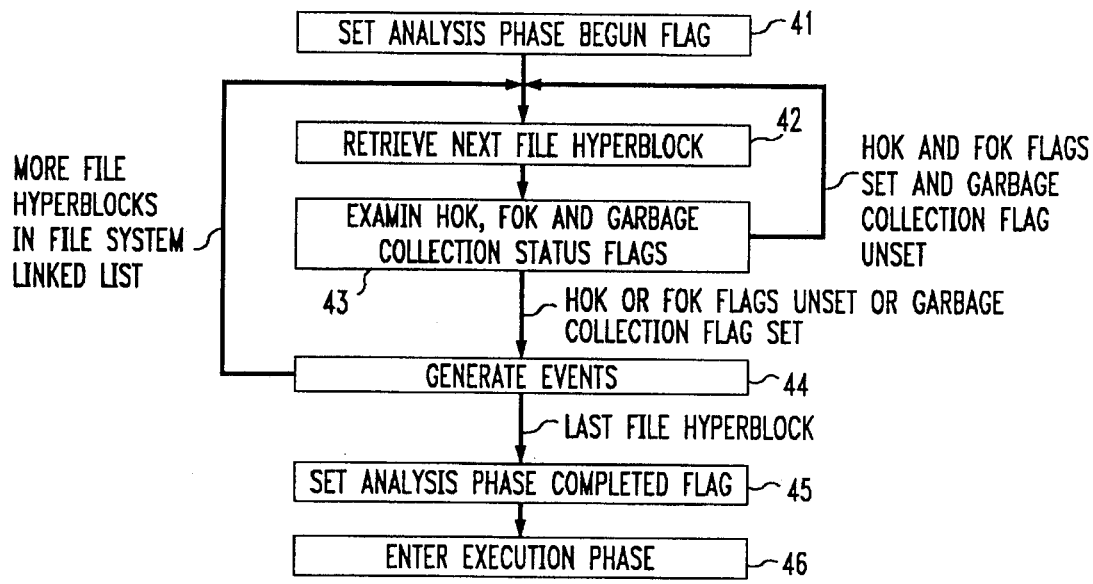
FIG. 4 is a flow chart depicting the analysis phase of the garbage collection process of the present invention.

The analysis phase is initiated through creation of a garbage collection event analysis object. Referring to the flowchart of FIG. 4, the event analysis object retrieves first sets the analysis phase begun flag and then retrieves the hyperblock 7 of each file in order of file system storage. The analysis object examines the hok, fok and garbage collection status flags contained in the hyperblocks 7 to determine the nature of the file and the action to be taken, if any. If either of the hok and fok flags are unset, this indicates that the file is a partially written file since the writing of either its hyperblock 7 or its file blocks 9 was not successfully completed. If the garbage collection flag was set during the writing process, this indicates that the file is an older duplicate of another file in that it has the same identifier or name as that of a file written to the file system 4 subsequent to the duplicate file. However, in other embodiments, the garbage collection flag may be set in response to detecting other file and/or file system characteristics. For example, the garbage collection flag could be set when the data sectors of the memory device are full and the file is determined to be the oldest file remaining in the file system 4. Finally, if the hok and fok flags are set and the garbage collection flag is unset, this then indicates that the file is a valid, new file to be maintained in the file system 4.

Once the status of a selected file has been determined by the analysis object, a sequence of executable events or memory operations is generated by the event analysis object and written to an event queue 24 provided in the event queue sector 22 of the FLASH memory device 2 only if the file is determined not to be a partially written file or a file selected for garbage collection. Consequently, for each valid, new file retrieved by the event analysis object, a sequence of events is written to the event queue 24 the execution of which will cause the associated file to be written from its original, source sector to the swap sector 26 in a contiguous manner with respect to other valid files previously copied to the swap sector 26. Additionally, in the event that it is determined that the swap sector 26 will be filled by execution of the preceding events, the sequence of events generated for a valid, new file will further include events that cause a selected destination sector to be erased, the swap sector 26 to be copied as an entire compacted sector to the destination sector and the swap sector 26 to be erased for further copying.

As previously mentioned, the events generated comprise individual memory operations selected on the basis of being sufficiently atomic (or fundamental) to ensure that they are re-executable in that a subsequent execution of the same operation (before execution of another operation) with the same associated data will not adversely change the state of the file system 4. A listing of sample events are set forth in Table II below:

TABLE II

| OPERATION NAME | DATA | DESCRIPTION |
|---|---|---|
| 1) EraseSector | sector number | erases entire sector identified |
| 2) CopyBlocks | source start block address number of blocks to copy destination start block address | copies the number of blocks specified from source start address to destination address |
| 3) WriteModified-Hyperblock | source block address destination block address number of free file system blocks address of the current hyperblock | calculates and writes to the hyperblock its new address, calculates and writes to the hyperblock the new number of file system blocks left after its last file block, and moves hyperblock from the source address to the destination address |

As shown in Table II, each event comprises an event ID or name and analysis data for use by an execution unit of the microprocessor 8 in the execution of the event. The analysis data associated with the memory operation for copying a the file blocks 9 of a file from an initial, source location to a final, destination location is generated by the analysis object based upon the file address and size information stored in its associated hyperblock 7 in addition to the next contiguous address to be written to in the swap sector 26 as is well known in the art. Wrap-around conditions need to be satisfied when a particular file spans more than one source sector and when all the file blocks 9 of a file will not fit within the remaining space of the swap sector 26 as is also well known in the art. Each event written to the event queue 24 also comprises an execution completion flag indicating whether the event has been executed. The flag is initially unset when the event is generated and later set when the execution unit has completed the memory operation corresponding to the event.

Figure 5:
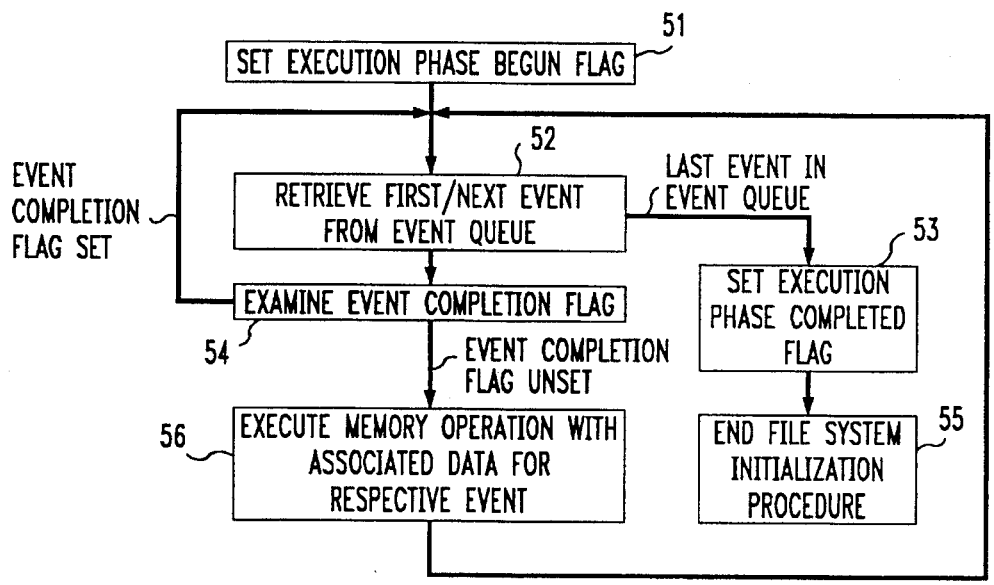
FIG. 5 is a flow chart depicting the execution phase of the garbage collection process of the present invention.

Once all files within the file system 4 have been acted upon by the event analysis object, the event analysis completion flag in the event queue sector 22 is set and an event execution object is created to initiate execution of the events sequentially stored in the event queue 24. Referring to the event execution flowchart of FIG. 5, after the event execution begun flag is set, the event execution object retrieves each event in FIFO order and examines its completion flag to determine whether the particular event has already been executed. If the flag is set, the event execution object retrieves the next event and examines its completion flag. When an event is found with its completion flag unset, the event execution object passes the event ID and associated data to the microprocessor 8 and a microprocessor execution unit executes the event in accordance with the defined memory operation. The event's completion flag is then set, however, the event and its data is still retained in the event queue 24 until all the events in the queue have been successfully executed.

When all events in the event queue 24 have been executed, the event execution object sets the event execution completion flag in the event queue sector 22 and subsequently clears the queue of all events and their associated data. It is noted, however, that instead of setting a completion flag for each event and clearing the entire queue after execution of all queued events, it is foreseeable that in some data storage devices 2, the event execution object could simply clear each event from the queue on an individual basis once it has been successfully executed.

If event execution was by chance interrupted due to a power failure, the execution of the file system initialization routine causes the microprocessor 8 to examine the phase progress flags where it is determined that the execution phase was interrupted. In such a case, a new event execution object is created and the object sequentially examines the completion flag for each event starting with the oldest event in the event queue 24. Event execution will then commence with that event for which execution was interrupted since it is the first event in the sequence of events in the event queue 24 not having its completion flag set.

In one embodiment of the present invention, the above-described file system 4 and garbage collection process are implemented in the secondary memory 2 of a memory system 1 of a software file storage mechanism for one of a telephone answering machine/system and a computer system. Software files downloaded from a telephone network or a computer network, respectively, are stored in sequential order within the memory system 1 for subsequent uploading to the main memory 6 of the memory system 1 for use in either user-oriented or system-oriented activities. When updated or new version software files are downloaded to the file storage mechanism, they are stored in the secondary memory 2 under the same name as that of the older software files. The older files are then marked for garbage collection, and the file storage mechanism retrieves only those software files of a particular name that have not been marked for collection.

In another embodiment of the present invention, the above-described file system 4 and garbage collection process are implemented in the secondary memory 2 of a memory system 1 of a message storage mechanism for one of a telephone answering machine/system and a computer system. Messages received over a telephone network or a computer network, respectively, are stored in sequential order within the memory system 1 as message files for subsequent output in the form of audio play or visual display on a television or computer monitor. This advantageously provides in the message storage mechanism an efficient means for recording audio, e-mail or facsimile messages, while minimizing the size of the required memory, and hence the cost of the product. When nearly all available memory of the message storage mechanism has been filled with recorded message files, the garbage collection process is invoked to remove the oldest of the message files instead of those files having the same name or identifier as previously described.

While the embodiments described herein disclose the primary principles of the present invention, it should be understood that these embodiments are merely illustrative since various additions and modifications, which do not depart from the spirit and scope of the invention, are possible. For example, it is foreseen that the garbage collection process described above may also be implemented in other types of file storage systems such as hard disc drives and floppy disc drives for computer systems. Accordingly, the forgoing Detailed Description is to be understood as being in all cases descriptive and exemplary but not restrictive, and the scope of the invention is to be determined not from the Detailed Description, but rather from the claims as interpreted according to the full breadth permitted by the patent laws.

What is claimed:

1. In a data storage device under control of microprocessor and having storage locations for storing files written to the data storage device, a method is provided for preventing a microprocessor stall during reboot of the microprocessor and initialization of the data storage device, the method comprising the steps:

writing files to a first storage area of the data storage device;

tagging those files successfully written to the first storage area of the data storage device with a first tag; and commencing initialization of the data storage device upon reboot of the microprocessor, the data storage device initialization forming a garbage collection routine comprising the steps of tagging files stored in the first storage area of the data storage device comprising unwanted files which are no longer desired for use with a second tag, and erasing files stored in the first storage area of the data storage device comprising files not tagged with the first tag and files tagged with the second tag.

2. The method of claim 1, wherein the step of erasing files stored in the first storage area of the data storage device comprising files not tagged with the first tag and files tagged with the second tag comprises the steps of:

copying both the files tagged with the first tag and the files not tagged with a second tag stored in the first storage area to a second storage area of the data storage device; and erasing the files stored in the first storage area of the data storage device.

3. The method of claim 2, wherein the second storage area comprises one of a storage area disposed within the first storage area and a storage area disposed outside of the first storage area.

4. The method of claim 2, wherein the data storage device comprises a read-mostly memory device.

5. The method of claim 4, wherein the event storage area comprises a storage area disposed outside of the first storage area.

6. The method of claim 4, wherein the read-mostly memory device comprises one of EEPROM memory device and a FLASH memory device.

7. The method of claim 4, wherein the event storage area comprises a storage area disposed outside of the first storage area.

8. In a data storage device under control of microprocessor and having storage locations for storing files written to the data storage device, a method is provided for preventing a microprocessor stall during reboot of the microprocessor and initialization of the data storage device, the method comprising the steps:

writing files to a first storage area of the data storage device;

tagging those files successfully written to the first storage area of the data storage device; and commencing initialization of the data storage device upon reboot of the microprocessor, the data storage device initialization comprising the steps of generating sequences of executable events comprising memory operations and associated data for untagged files which when executed cause the untagged files to be removed from the data storage device, writing the generated events to an event storage area in the data storage device, and executing the events written to the event storage area of the data storage device to remove the untagged files from the first storage area of the data storage device.

9. The method of claim 8, wherein the event storage area is disposed outside of the first storage area of the data storage device.

10. The method of claim 8, wherein the data storage device comprises a read-mostly memory device having a flat file structure in which files are read from and written to the data storage device in a contiguous manner.

11. The method of claim 10, wherein the event storage area is disposed outside of the first storage area of the read-mostly memory device.

12. The method of claim 8, wherein the events comprise memory operations and associated data and are each re-executable upon interruption of an execution of a respective event and before execution of another event without modifying results of a previous execution of the respective event.

13. The method of claim 12, wherein the data storage device comprises a read-mostly memory device.

14. The method of claim 12, wherein the data storage device comprises one of an EEPROM memory device and a FLASH memory device, and wherein the event storage area is disposed outside of the first storage area of the data storage device.

15. In a data storage system comprising a microprocessor for controlling access to a data storage device, the data storage device having storage locations for contiguously storing files written to the data storage device, a method is provided for ensuring the integrity of files written to the data storage device upon the occurrence of a failure comprising one of a power failure and a system failure in the data storage system, the method comprising the steps of:

(a) writing files to a first storage area of the data storage device;

(b) tagging with a first tag those files successfully written to the first storage area of the data storage device; and (c) commencing initialization of the data storage device after occurrence of a failure, the initialization of the data storage device comprising the steps of (1) commencing a garbage collection analysis routine comprising the steps of (a) tagging with a second tag those files stored in the first storage area of the data storage device determined to be unwanted files no longer desired for use, and (b) writing to an event storage area of the data storage device sequences of executable events for files comprising one of files not tagged with the first tag and files tagged with the second tag, the sequences of executable events comprising memory operations and associated data which when executed cause the unwanted files to be removed from the data storage device, (2) commencing a garbage collection execution routine comprising the steps of:

(a) executing the events written to the event storage area to cause the files tagged with the first tag and not tagged with the second tag to be copied from respective source storage locations in the first storage area to respective destination storage locations in a second storage area and further cause the files stored in the first storage area to be erased, and (b) setting an event executed flag for each event in the event storage area of the data storage device upon successful execution of each individual event, and (3) erasing the events stored in the event storage area of the data storage device.

16. The method of claim 15, wherein when the failure does not occur during the step (c), the method further comprises the step of proceeding to step (c) to commence initialization of the data storage device.

17. The method of claim 15, wherein when the failure occurs during the step (c), the method further comprises the steps of:

erasing the events stored in the event storage area of the data storage device and returning to step (c)(1) to commence a new garbage collection analysis routine if the failure occurred in the step (c)(1); and returning to step (c)(2) to commence or resume execution of events stored in the event storage area of the data storage device if the failure occurred in the step (c)(2).

18. The method of claim 17, wherein the step of returning to step (c)(2) to commence or resume execution of events stored in the event storage area of the data storage device if the failure occurred in step (c)(2) comprises the step of executing those events not having an event executed flag set starting with the first event stored in the event storage area not having its event executed flag set.

* * * * *